United States Patent [19]
Patel

[11] Patent Number: 6,014,085
[45] Date of Patent: Jan. 11, 2000

[54] STRENGTHENING THE AUTHENTICATION PROTOCOL

[75] Inventor: Sarvar Patel, Montville, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/958,117

[22] Filed: Oct. 27, 1997

[51] Int. Cl.[7] .................................. H04L 9/00; H04B 7/00
[52] U.S. Cl. ................................ 340/825.34; 340/825.31; 380/3; 380/23; 455/410; 455/411
[58] Field of Search .......................... 340/825.34, 825.31; 380/23–5, 3; 455/403, 410, 1, 411

[56] References Cited

U.S. PATENT DOCUMENTS

| | | | |
|---|---|---|---|
| 5,091,942 | 2/1992 | Dent | 380/46 |
| 5,448,760 | 9/1995 | Frederick | 455/410 |
| 5,481,611 | 1/1996 | Owens et al. | 380/25 |

OTHER PUBLICATIONS

S. Patel, "Weakness of North American Wireless Authentication Protocol," IEEE Personal Communications, vol. 4, No. 3, Jun. 1997, pp. 40–44, XP000655315.

Primary Examiner—William A. Cuchlinski, Jr.
Assistant Examiner—Yonel Beaulieu
Attorney, Agent, or Firm—Jimmy Goo

[57] ABSTRACT

The invention strengthens authentication protocols by making it more difficult for handset impersonators to gain system access using replay attacks. This goal is accomplished using challenge codes as a parameter for determining authentication codes, whereby different challenge codes cause different authentication codes to be generated. In one embodiment, the challenge codes are functions of challenge types (e.g., global or unique challenges) and/or handset states (e.g., call origination, page response, registration, idle, and SSD-A update). This embodiment prevents handset impersonators from successfully utilizing replay attacks to impersonate a legitimate handset if the legitimate handset is in a different state than the handset impersonator, or if the legitimate handset is responding to a different challenge type than the handset impersonator.

16 Claims, 6 Drawing Sheets

| CHALLENGE TYPE | CHALLENGE TYPE BIT VALUE |
|---|---|
| GLOBAL-CALL ORIGINATION | 0001 |
| GLOBAL-PAGE RESPONSE | 0010 |
| GLOBAL-REGISTRATION | 0011 |
| UNIQUE-IDLE | 0100 |
| UNIQUE-CALL ORIGINATION AND FLASH REQUEST | 0101 |
| UNIQUE-PAGE RESPONSE | 0110 |
| UNIQUE-SSD UPDATE | 0111 |

STRENGTHENING THE AUTHENTICATION PROTOCOL

FIELD OF THE INVENTION

The present invention relates generally to wireless communication systems and, in particular, to authentication protocols.

BACKGROUND OF THE INVENTION

The wireless communication industry loses hundreds of millions of dollars a year to fraud. Much of the fraud comes from handset or mobile-telephone impersonators (e.g., unauthorized subscribers or users of wireless communications networks) using user identity information associated with legitimate handsets or mobile-telephones (e.g., authorized subscribers or users of wireless communications networks), such as mobile identification numbers (MIN) and/or electronic serial numbers (ESN), to gain system access to wireless communications networks. Many different techniques have been developed to reduce wireless communication fraud. Such techniques include using authentication protocols to verify whether a requesting handset or mobile-telephone (i.e., handset seeking to gain system access) is a legitimate handset or mobile-telephone.

Authentication protocols generally involve a handset transmitting an authentication code to a wireless communications network. The authentication code is a secret key associated with the handset and is used by the network to authenticate or verify whether the handset is a legitimate handset. The authentication code is either known to the handset and network, or may be determined independently by the handset and the network. If the handset's authentication code (i.e., authentication code transmitted by the handset) does not match the network's authentication code for the handset (i.e., authentication code known or determined by the network to be associated with the handset), the handset is not authenticated and will be denied system access to the wireless communications network. If the handset's authentication code matches the network's authentication code for the handset, the handset is authenticated and will be allowed system access to perform system access functions, such as registration, page response and call origination.

Figure 1:
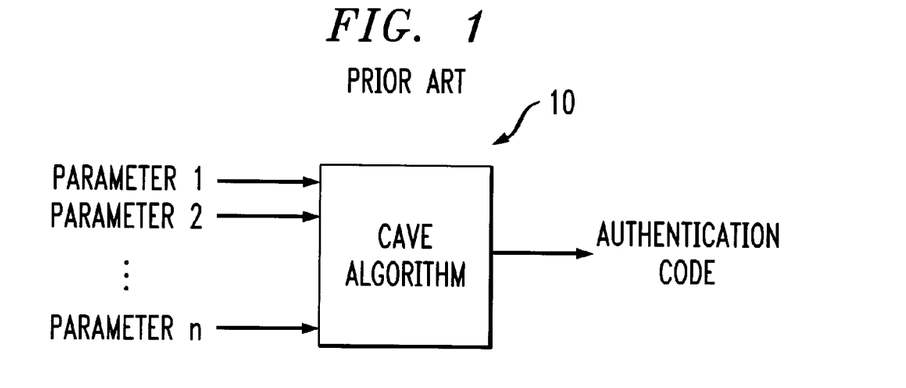
FIG. 1 depicts a plurality of parameters x being used as inputs for a CAVE algorithm.

The background of the present invention will be described herein with reference to the well-known IS-41 standard, which is the North American standard for intersystem signaling for wireless communications networks. This should not, however, be construed to limit the present invention in any manner. The IS-41 standard defines authentication protocols which use a cryptographic function known as the Cellular Authentication and Voice Encryption (CAVE) algorithm to determine an authentication code. FIG. 1 is an illustration 10 showing a plurality of parameters x being used as inputs for the CAVE algorithm. At least one of the parameters x is a private key uniquely associated with the handset and is known only to the handset and the network. The parameters x are provided as inputs to the CAVE algorithm to obtain an authentication code. One notable feature of the CAVE algorithm is that there exist no known method for reversing or breaking the CAVE algorithm.

In one implementation of the IS41 standard, the CAVE algorithm is executed using a microprocessor or an Application Specific Integrated Circuit (ASIC), and the parameters x are stored in a plurality of registers (hereinafter referred to as CAVE registers) from which they are loaded into the microprocessor or ASIC. The CAVE registers include a 32 bit linear feedback shift register (LFSR), sixteen 1 byte registers (i.e., R00 through R15), and two 1 byte offset registers (i.e., offset 1 and offset 2).

Figure 2:
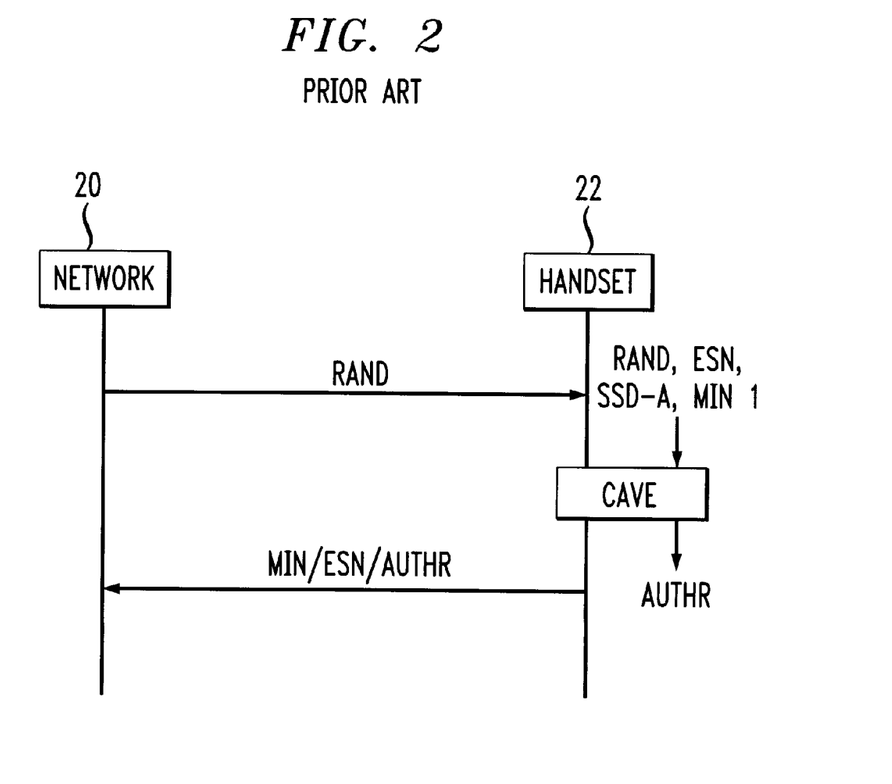
FIG. 2 illustrates the IS-41 authentication protocol for a global challenge.

The authentication protocols defined by the IS-41 standard include global challenges and unique challenges, as will be described herein. Global challenges require every handset attempting to gain system access to respond with an authentication code referred to herein as an authentication-random code (AUTHR). FIG. 2 illustrates the authentication protocol for a global challenge. A network 20 issues a global challenge by generating and broadcasting a global random number (RAND) to be used by every handset (attempting to gain system access) to respond with an AUTHR. The global challenge is received by a handset 22, which uses the RAND and other information as parameters for generating the AUTHR. Note that the handset 22 should respond with its AUTHR before expiration of a predetermined or random time interval, wherein the network 20 issues a new global challenge upon expiration of such time interval.

Figure 3:
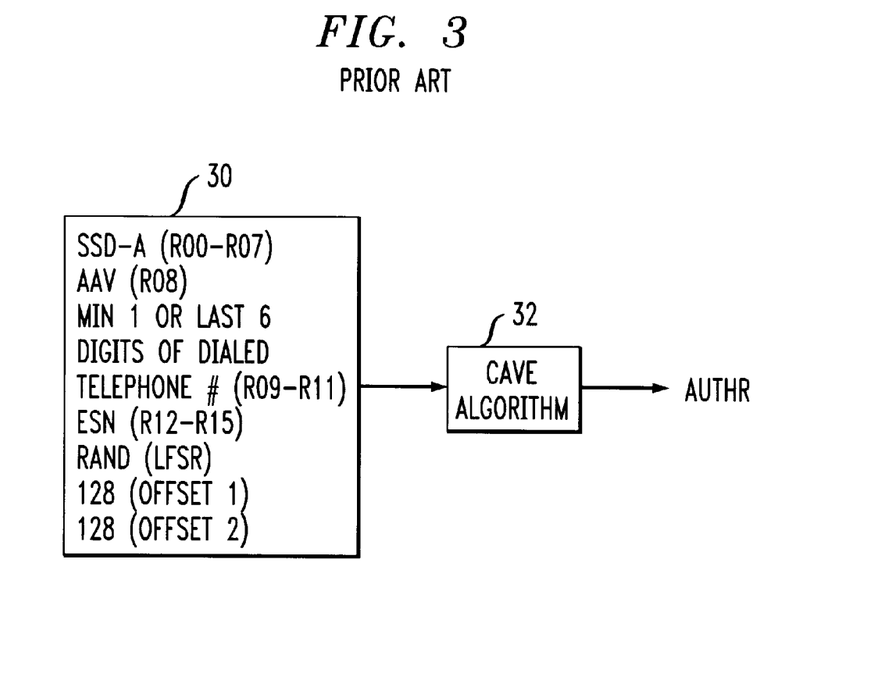
FIG. 3 illustrates the parameters for generating an AUTHR in response to a global challenge.

FIG. 3 illustrates the parameters for generating the AUTHR in response to a global challenge. The parameters are loaded from CAVE registers 30 into a microprocessor 32 executing the CAVE algorithm. Specifically, the following AUTHR parameters are loaded from the CAVE registers 30 to the microprocessor 32: secret shared data A (SSD-A) from registers R00–R07; authentication algorithm version (AAV) from register R08; MIN 1 from registers R09–R11 if the handset wants to perform registration or page response; the last six digits of a telephone number to be dialed from registers R09–R11 if the handset wants to perform call origination; electronic serial number (ESN) from registers R12–R15; the RAND from the LFSR; and a value of one hundred twenty eight (128) from offsets 1 and 2. The SSD-A is a private key known only to the network 20 and the handset 22; the AAV specifies the version of the CAVE algorithm being used to generate the authentication code; the MIN 1 is the NXX-XXXX portion of a mobile identification number (MIN); and the ESN identifies the make and model of the handset 22. The RAND is typically XOR (i.e., exclusive OR) with the thirty-two most significant bits of the SSD-A, and then XOR with the thirty-two least significant bits of the SSD-A.

The handset 22 responds to the global challenge by transmitting to the network its output from the microprocessor 32 (i.e., AUTHR) along with its MIN and ESN. If the handset 22 wants to perform the call origination function, the handset will also include the complete telephone number in its response. The network 20 uses the MIN and/or ESN in the handset's response to determine the SSD-A and the AAV for the handset 22. For example, the network 20 uses one or more look-up tables that correlate MINs and/or ESNs to SSD-As and AAVs in order to determine a SSD-A and an AAV for a given MIN and/or ESN. Upon determining the SSD-A and AAV for the received MIN and/or ESN, the network 20 uses the appropriate version of the CAVE algorithm (as indicated by the AAV) to independently determine its AUTHR. Specifically, the network 20 uses as input parameters for the CAVE algorithm the SSD-A and AAV values determined by the network 20, the RAND generated by the network 20, the NXX-XXXX portion of the received MIN (i.e., MIN 1), the received ESN and the value of one hundred twenty eight (128) for the offsets 1 and 2. Note that the last six digits of the received telephone number is substituted for the MIN 1 if the handset wants to perform call origination. The network's AUTHR is compared to the handset's AUTHR (transmitted by the handset 22) to authenticate the handset 22.

Figure 4:
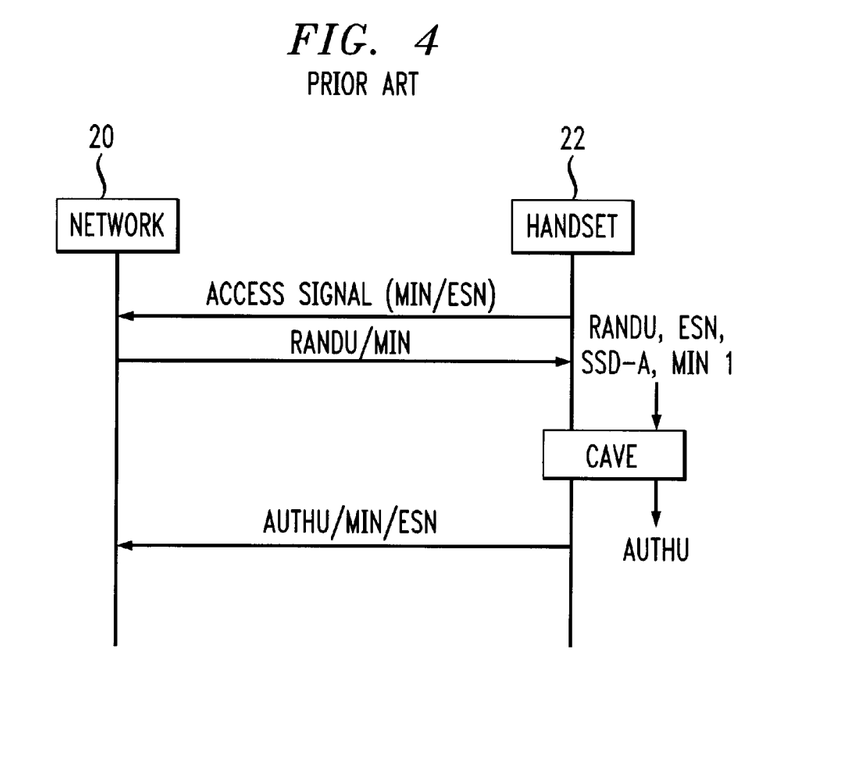
FIG. 4 illustrates the authentication protocol for a unique challenge.

If the handset's response to the global challenge fails or if the network 20 does not use global challenges to authenticate handsets, the network 20 may issue a unique challenge to authenticate handsets. Unlike a global challenge, a unique challenge is directed to a particular handset attempting to gain system access. FIG. 4 illustrates the authentication protocol for a unique challenge. The handset 22 transmits an access signal to the network 20. The access signal includes the handset's MIN and ESN and an indication that the handset 22 wants to gain system access to perform a system access function, such as call origination, page response or registration. The network 20 issues a unique challenge to the handset 22 to respond with an authentication code referred to herein as an authentication-unique random code (AUTHU). The unique challenge includes the handset's MIN (to indicate the particular handset to which the unique challenge is directed) and a random-unique number (RANDU) generated by the network 20, which is to be used by the handset to respond with the AUTHU.

Figure 5:
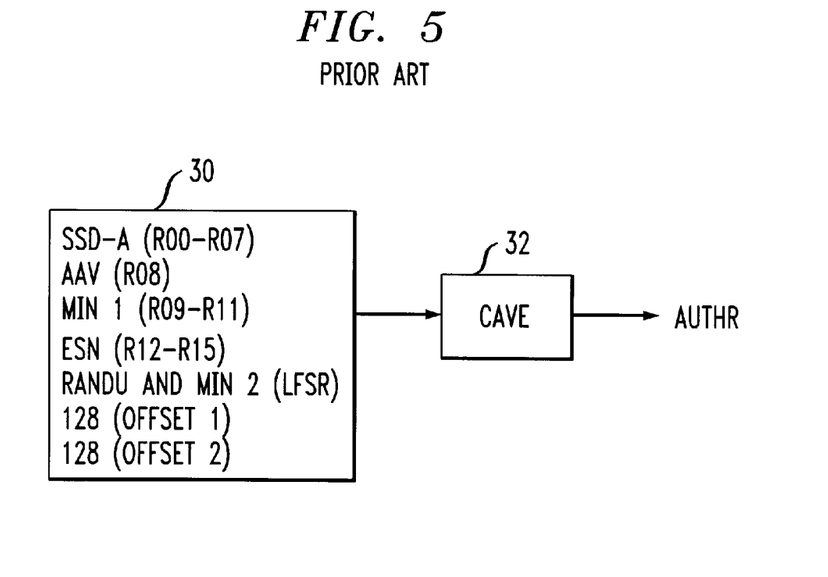
FIG. 5 illustrates the parameters for generating the AUTHU in response to a unique challenge.

The handset 22 receives the unique challenge and uses the RANDU and other information as parameters for generating the AUTHU. FIG. 5 illustrates the parameters for generating the AUTHU in response to a unique challenge. The parameters are loaded from the CAVE registers 30 to the microprocessor 32 executing the CAVE algorithm. Specifically, the following parameters are loaded: the secret shared data A (SSD-A) from registers R00–R07; the authentication algorithm version (AAV) from register R08; the MIN 1 from registers R09–R11; the electronic serial number (ESN) from registers R12–R15; the RANDU and MIN 2 from the LFSR, wherein the MIN 2 is the NPA portion (i.e., area code) of the mobile identification number; and a value of one hundred twenty eight (128) from offsets 1 and 2. Note that the AUTHU parameters differ from the AUTHR parameters in that the former parameters include the RANDU and MIN 2 instead of the RAND, and the MIN 1 for call origination instead of the last six digits of the telephone number to be dialed. The handset 22 responds by transmitting to the network 20 its AUTHU along with its MIN, ESN and/or telephone number to be dialed. The network 20 uses the MIN and ESN (received via the handset's response) to generate its own AUTHU for comparison with the handset's AUTHU (for purposes of authenticating the handset 22).

Both of the above-described authentication protocols have weaknesses which make it possible for an impersonator or cloner to steal services from a network by impersonating a legitimate handset. These weaknesses are typically subject to replay attacks wherein the impersonator intercepts an authentication code transmitted by a legitimate handset and replays (or re-transmits) the intercepted authentication code to the network. Thus, the impersonator pretends to be the legitimate handset in order to gain system access to the network.

Figure 6:
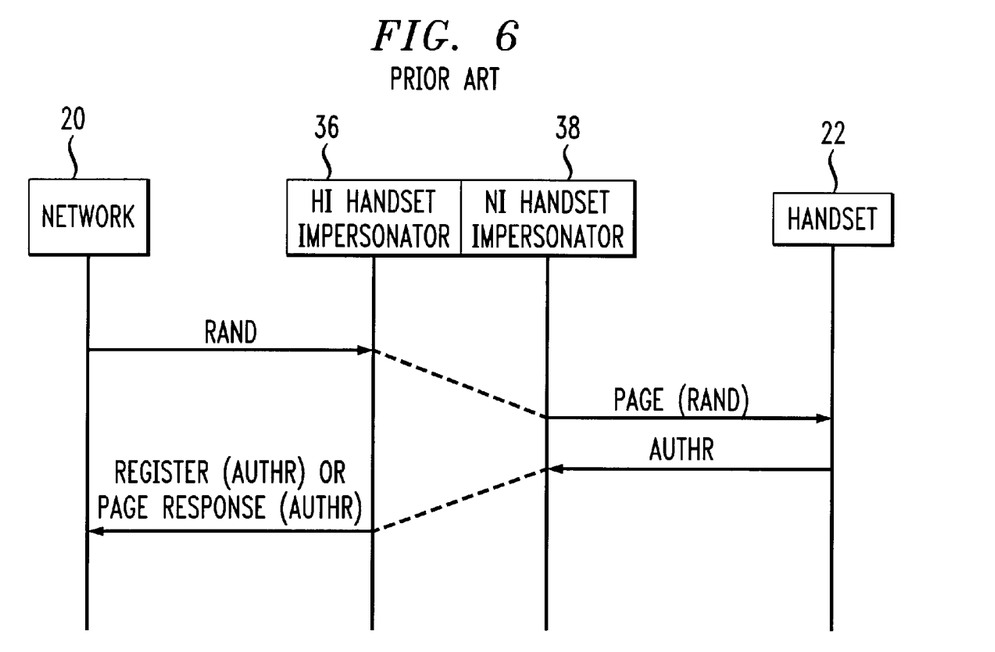
FIG. 6 illustrates how an impersonator or cloner might respond to a global challenge using a replay attack.

FIG. 6 illustrates how an impersonator or cloner might respond to a global challenge using a replay attack. The impersonator comprises a network impersonator 36 (for portraying itself as a legitimate network to a legitimate handset) and a handset impersonator 38 (for portraying itself as a legitimate handset to a legitimate network). The network impersonator 36 obtains a victim handset 22's (i.e., legitimate handset) MIN and ESN by listening to communication channels over which the victim handset 22 typically transmits its MIN and ESN—that is, the network impersonator 36 intercepts the victim handset's MIN and ESN. About the same time or some time thereafter, the handset impersonator 38 listens for the RAND broadcasted by the network 20 via a global challenge. The handset impersonator 38 relays the RAND to the network impersonator 36, which page queries the victim handset 22 (i.e., solicits the victim handset 22 to respond with a page response) and issues a false global challenge with the RAND received by the handset impersonator 38 (and issued by the legitimate network 20).

The victim handset 22 receives the network impersonator's page query and global challenge (with the RAND) and determines an AUTHR using the RAND and its SSD-A, AAV, MIN1 and ESN (and the value of 128 for the offsets). Upon determining its AUTHR, the victim handset responds to the network impersonator's page query and global challenge with its MIN, ESN and AUTHR. The network impersonator 36 relays the victim handset's response to the handset impersonator 38, which replays or sends it to the network 20 as the handset impersonator's response to the global challenge. In other words, the handset impersonator 38 gains system access by pretending to be the victim handset 22.

The above described replay attack on global challenges is effective for handset impersonators attempting to gain system access to perform page response or registration because the victim handset determined the AUTHR using the MIN1. Gaining system access to perform page response and registration allows the handset impersonator 38 to register as the victim handset 22 and receive telephone calls dialed to the victim handset's telephone number. However, the replay attack of FIG. 6 does not allow the handset impersonator 38 to gain system access to perform call origination because the victim handset determined the AUTHR using the MIN1 and not the last six digits of the telephone number to be dialed. To respond successfully to a global challenge and perform call origination using the replay attack of FIG. 6, the impersonator would need to obtain an AUTHR from the victim handset 22 determined using the last six digits of the telephone number the impersonator wants to dial. Since the impersonator cannot make the victim handset 22 determine a AUTHR using a specific telephone number (i.e., telephone number handset impersonator wants to dial), the above described replay attack cannot be used by the impersonator to perform call origination.

Figure 7:
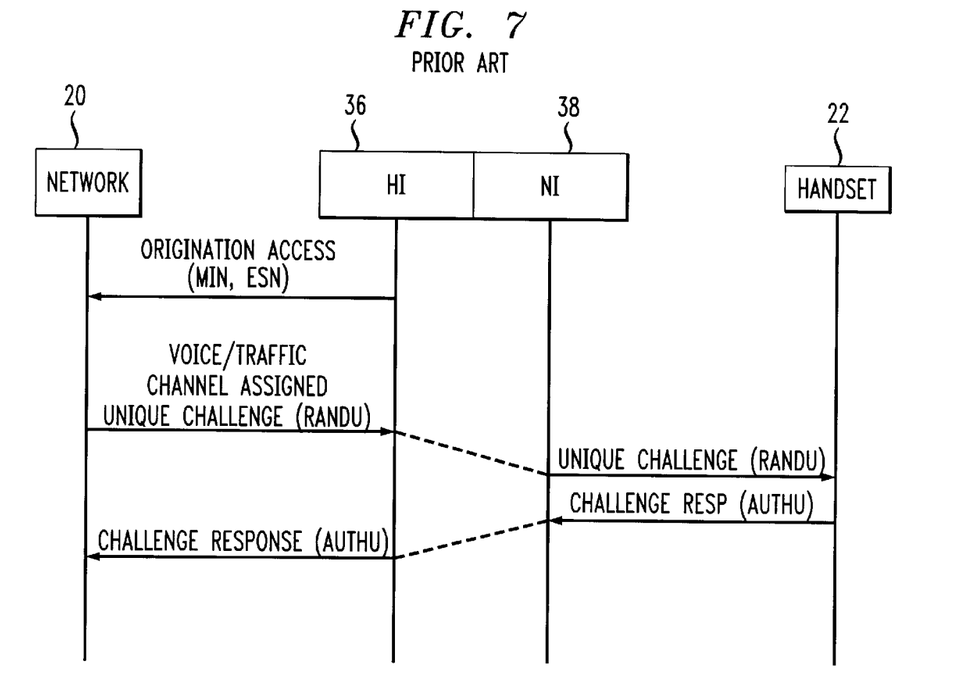
FIG. 7 illustrates how an impersonator or cloner might respond to a unique challenge using a replay attack.

FIG. 7 illustrates how an impersonator or cloner might respond to a unique challenge using a replay attack. A replay attack upon a unique challenge first begins with the network impersonator 36 obtaining the MIN and ESN of the victim handset 22. The MIN and ESN are relayed to the handset impersonator 38, which uses the MIN and ESN to request system access to the network 20. The network 20 issues a unique challenge by generating and transmitting to the handset impersonator 38 a RANDU along with the MIN of the victim handset 22 (being used by the handset impersonator 38 to request system access). The handset impersonator 38 relays the RANDU number to the network impersonator 36 which, in turn, sends a unique challenge (using the RANDU and the victim handset's MIN) to the victim handset 22. The victim handset 22 responds with an AUTHU determined using the RANDU. The network impersonator 36 relays the AUTHU to the handset impersonator 38 which, in turn, replays the AUTHU in response to the unique challenge posed to the handset impersonator 38 by the network 20. The AUTHU transmitted by the handset impersonator 38 will match the network's AUTHU for the victim handset 22, thus the handset impersonator 38 gains system access to the network 20. Unlike global challenges, the telephone number being dialed by the victim handset (or handset impersonator) is never a function of the AUTHU. Thus, the handset impersonator can effectively respond to a unique challenge and gain system access to perform call origination.

Accordingly, there exists a need for strengthening authentication protocols against replay attacks by handset impersonators.

SUMMARY OF THE INVENTION

The present invention strengthens authentication protocols by making it more difficult for handset impersonators to gain system access using replay attacks. The present invention accomplishes this goal by using challenge codes as a parameter for determining authentication codes, whereby different challenge codes cause different authentication codes to be generated. In one embodiment, the challenge codes are functions of challenge types (e.g., global or unique challenges) and/or handset states (e.g., call origination, page response, registration, idle, and SSD-A update). This embodiment prevents handset impersonators from successfully utilizing replay attacks to impersonate a legitimate handset if the legitimate handset is in a different state than the handset impersonator, or if the legitimate handset is responding to a different challenge type than the handset impersonator. Specifically, the legitimate handset will determine an authentication code that is a function of its current state and/or the type of challenge being issued, and the network will determine an authentication code that is a function of the type of challenge (issued by the network) and the current state of the handset requesting system access. If the handset impersonator wants to respond to a challenge but is in a state that conflicts with the legitimate handset's current state, then the handset impersonator cannot use the authentication code generated by the legitimate handset to successfully respond to the challenge. Likewise, if the handset impersonator is issued a global challenge, the handset impersonator cannot use the authentication code generated by a legitimate handset in response to a unique challenge, or vice-versa In another embodiment, the challenge code is also a function of location and time.

BRIEF DESCRIPTION OF THE DRAWINGS

The features, aspects, and advantages of the present invention will become better understood with regard to the following description, appended claims, and accompanying drawings where:

DETAILED DESCRIPTION

For illustration purposes, the present invention is described herein with respect to the authentication protocols defined by the well-known IS-41 standard. This should not be construed, however, to limit the present invention in any manner. It would be apparent to one of ordinary skill in the art to apply the principles of the present invention to other authentication protocols.

Figure 8:
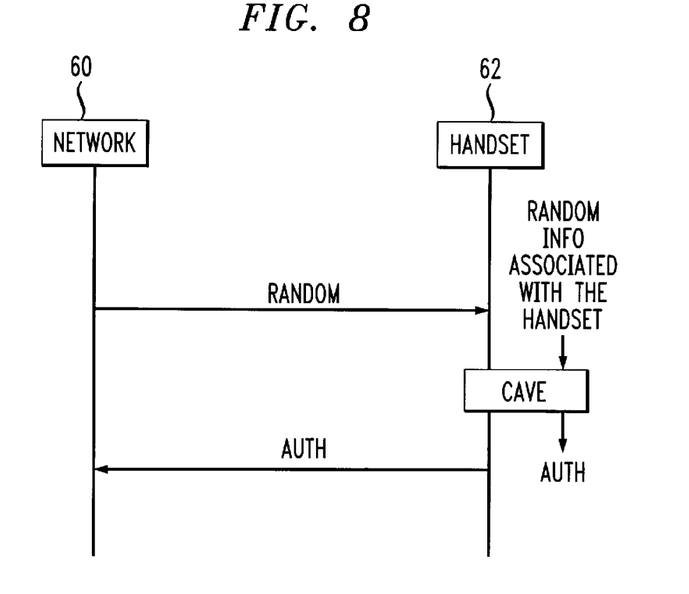
FIG. 8 illustrates an authentication protocol in accordance with the present invention.

FIG. 8 illustrates an authentication protocol used in accordance with the present invention. A wireless communication network or an authentication center 60 issues a challenge to a handset 62 attempting to gain system access. Specifically, the network 60 generates and transmits a random number (RANDOM), which is to be used by the handset 62 to determine an authentication code (AUTH) in response to the challenge. The challenge may be a global challenge or a unique challenge. In the case of the latter, the network 60 will also transmit a mobile identification number (MIN) specifying the handset to which the challenge is being issued.

Upon receiving the challenge, the handset 62 determines the AUTH using the RANDOM and a first set of information associated with the handset 62 (or user) as parameters for its cryptographic function, such as the well-known CAVE algorithm, as will be described herein. The handset 62 transmits the AUTH and a second set of information associated with the handset 62 (or user) to the network 60 as its response to the network's challenge. Note that the second set of information associated with the handset may include all or a portion of the first set, or may not include any portion of the first set. Examples of the first and second sets of information will be provided herein.

Figure 9:
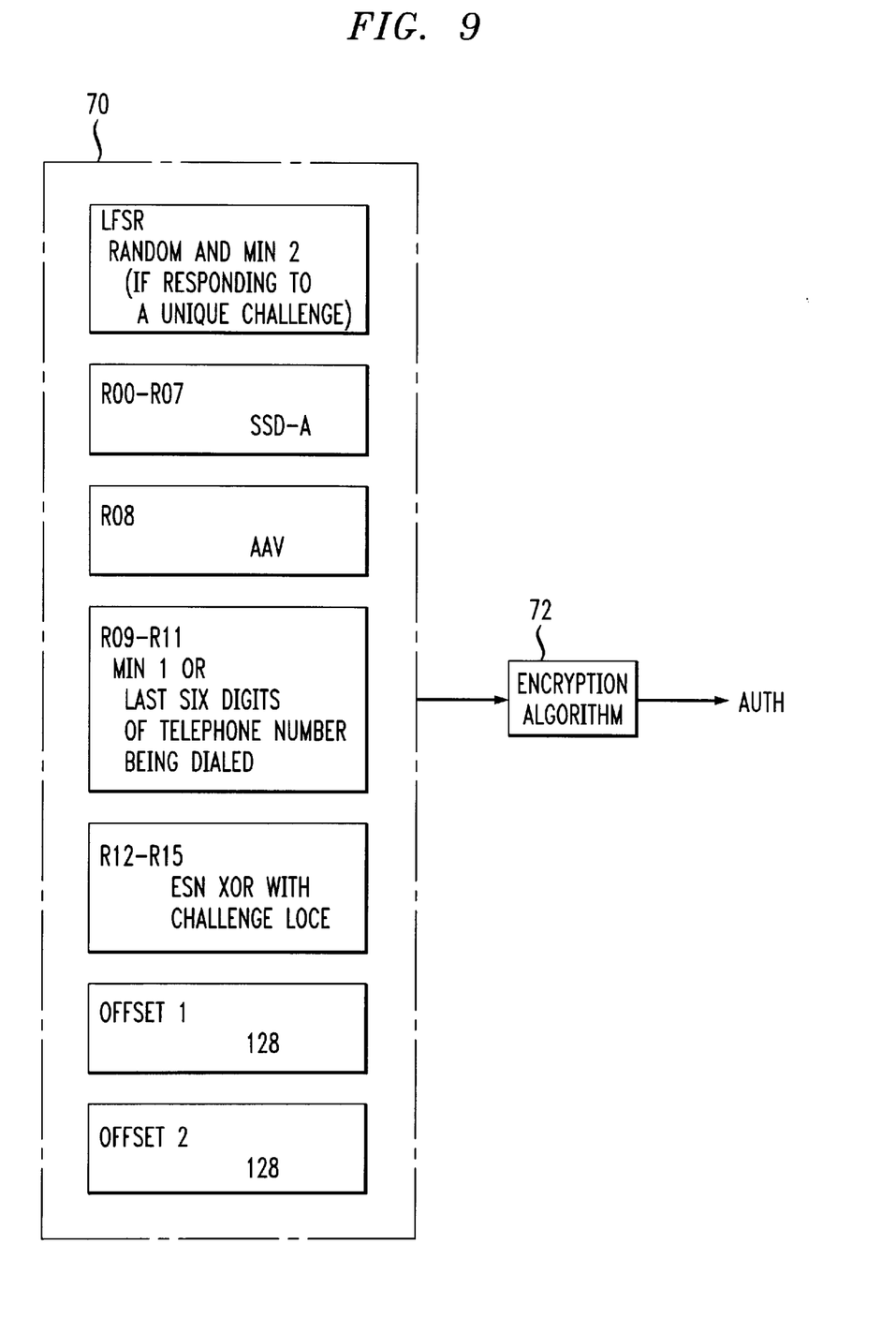
FIG. 9 illustrates a manner for determining an AUTH at the handset (and the network) in response to a challenge.

FIG. 9 illustrates a manner for determining the AUTH at the handset 62 (and the network 60) in response to a challenge. Parameters are stored in a plurality of registers 70 and provided as input to the cryptographic function executing on a microprocessor 72. In one embodiment of the present invention, the plurality of registers 70 include a 32 bit linear feedback shift register (LFSR), sixteen 1 byte registers (R00 through R15), and two 1 byte offset registers (offset 1 and offset 2).

In one embodiment, the first set of information include AUTH parameters. The AUTH parameters include, but are not limited to, secret shared data A (SSD-A), an authentication algorithm version (AAV), portions of a mobile identification number (MN) referred to herein as MIN 1 and MIN 2, a portion (or all) of a telephone number to be dialed, an electronic serial number (ESN), offset values, the RANDOM number, and a challenge code. The SSD-A is a private key known only to the network 60 and the handset 62; the AAV specifies the version of the CAVE algorithm being used by generate the authentication code; the MIN 1 and MIN 2 are the NXX-XXXX and NPA portions, respectively, of the MIN; and the ESN identifies the make and model of the handset 62.

The challenge code is a parameter that is a function of the type of challenge (e.g., global or unique) and/or the state of the handset. Handset states include, but are not limited to, registration, call origination, page response, shared secret data update, and idle. Each challenge code has associated a different bit value depending on the aforementioned factors. When used as an input to the cryptographic function, the challenge code will cause a different AUTH to be determined for each challenge code. Using challenge codes will eliminate replay attacks by an impersonator (comprising a network impersonator and a handset impersonator) across different challenge codes, but does not eliminate replay attacks within the same challenge codes, as will be described herein. Note that the challenge code may also be a function of the handset's or network's location and/or time.

The second set of information should indicate the information used to determine the AUTH (e.g., the first set of information). For example, the second set of information includes the MIN and the ESN, from which the MIN1 and AAV (and other parameters) may be determined using a database.

Figure 10:
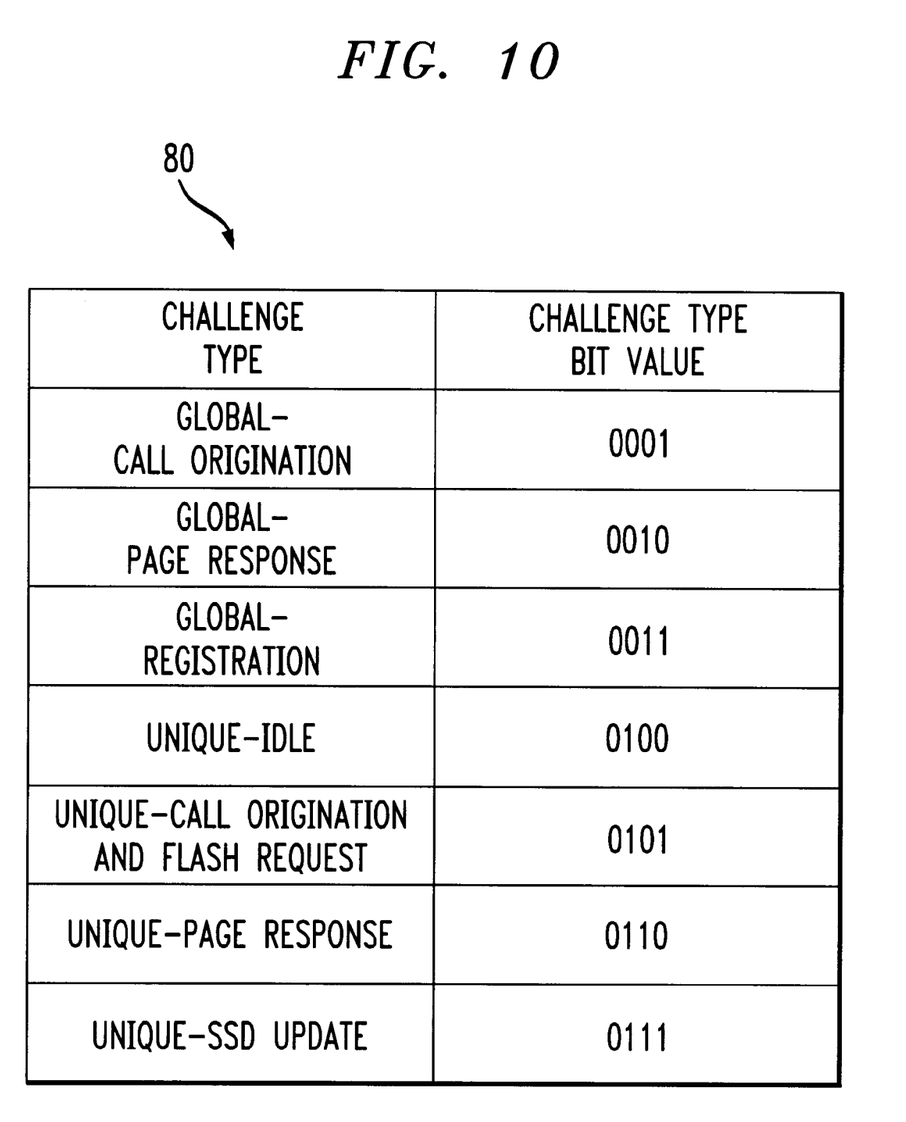
FIG. 10 is a table illustrating examples of challenge codes and their associated values.

FIG. 10 is a table 80 illustrating examples of challenge codes and their associated values. The first three challenge codes correspond to global challenges for handsets in call origination, registration and page response states. The last four challenge codes correspond to unique challenges for handsets in idle, call origination/flash request, page response and secret shared data update states. Each of the challenge codes have associated a unique 4 bit value that is used to determine different authentication codes.

Suppose for example an impersonator wants to gain system access to perform call origination. The network issues a unique challenge to the impersonator. The impersonator page queries and issues a unique challenge to a victim handset in order to solicit an AUTH from the victim handset. The victim handset responds with its AUTH determined using the challenge code for "unique-page response" (i.e., bit value 0110). The impersonator replays the victim handset's AUTH to the network. Recall that the impersonator is attempting to perform call origination. This is not the same state as the victim handset, which is attempting to perform page response. Upon receiving the victim handset's AUTH from the impersonator, the network determines its own AUTH for the victim handset using the challenge code for "unique-call origination and flash request" (i.e., bit value 0101), which is the current state of the impersonator. The network's AUTH will not match the victim handset's AUTH (replayed by the impersonator) and, thus, the impersonator will be denied system access to perform call origination.

In one embodiment of the present invention, the parameters are loaded in the following registers 70: secret shared data A (SSD-A) in registers R00–R07; authentication algorithm version (AAV) in register R08; MIN 1 in registers R09–R11 if the handset is in a registration, page response, or idle state responding to a global challenge or in any state responding to a unique challenge; the last six digits of the telephone number to be dialed from registers R09–R11 if the handset is in a call origination state responding to a global challenge; electronic serial number (ESN) in registers R12–R15; the RANDOM in the LFSR if the handset is responding to a global challenge; the RANDOM and MIN 2 in the LFSR if the handset is responding to a unique challenge; and offset values of one hundred twenty eight (128) in offset registers 1 and 2. The RAND is typically XOR with the thirty-two most significant bits of the SSD-A, and then XOR with the thirty-two least significant bits of the SSD-A. Note that in IS-41, the RANDOM is a 32 bit value if the challenge is a global challenge, and the RANDOM is a 24 bit value if the challenge is a unique challenge.

The challenge code can be provided as input for the cryptographic function in a variety of manners. In one embodiment, the challenge code is XOR with one of the other parameters, wherein the result is provided as input to the cryptographic function. For example, the last nibble of register R15 (i.e., last four bits of the ESN) is XOR with a four bit value challenge code and provided as input to the cryptographic function. Bits from other registers could also be XOR using the challenge code, including the offset registers 1 and 2. It is not recommended, however, to XOR the challenge code with any portion of the SSD-A nor with any bits in the LFSR.

In another embodiment, a portion of one or more parameters is substituted with the challenge code and provided as an input parameter to the cryptographic function. In an embodiment using a different cryptographic function or a encryption algorithm, additional registers are added in which the challenge code will be stored and loaded into the microprocessor (executing the cryptographic function or encryption algorithm).

The authentication protocol can be further strengthened for unique challenges to handsets attempting to perform call origination if a portion or all of the dialed telephone number is used as a parameter for the cryptographic function. This is possible if the dialed telephone number is stored for a portion or all of the duration of the telephone call. This strengthens the defense against replay attacks against call origination because the telephone number dialed by the impersonator will be different from the telephone number dialed by the victim handset. Thus, the authentication code of interest to the impersonator will be different from the authentication code determined by the victim handset and associated with the call originated from the victim handset.

Although the present invention has been described in considerable detail with reference to certain embodiments of wireless communications networks using authentication protocols based on the IS-41 standard, other versions are possible. It should readily be apparent to one of ordinary skill in the art that the present invention is equally applicable to other types of authentication protocols and different cryptographic functions or encryption algorithms. Therefore, the spirit and scope of the present invention should not be limited to the description of the embodiments contained herein.

I claim:

1. A method of authentication comprising the steps of:
   receiving a first authentication code from a user; and
   authenticating the user using the first authentication code and a second authentication code, the second authentication code determined using a challenge code and information associated with the user, wherein the challenge code is a function of at least a type associated with an issued challenge and a state of a mobile-transmitter responding to the issued challenge.

2. The method of claim 1, wherein the user is authenticated if the first authentication code is identical to the second authentication code.

3. The method of claim 1, wherein the user is not authenticated if the first authentication code is not identical to the second authentication code.

4. A method for authenticating a mobile-transmitter at a network comprising the steps of:
   issuing a challenge to the mobile-transmitter;
   receiving a response to the challenge from the mobile-transmitter, the response having a first authentication code and information associated with the mobile-transmitter;
   determining a second authentication code using the information associated with the mobile-transmitter and a challenge code, wherein the challenge code is a function of at least a type associated with an issued challenge and a state of a mobile-transmitter responding to the issued challenge; and
   authenticating the mobile-transmitter using the first authentication code and the second authentication code.

5. The method of claim 4, wherein the challenge code is a function of a location associated with the mobile-transmitter.

6. The method of claim 4, wherein the challenge code is a function of time at the mobile-transmitter.

7. The method of claim 4, wherein the information associated with the mobile-transmitter includes a portion of a mobile-transmitter identification number and an electronic serial number.

8. The method of claim 4, wherein the information associated with the mobile-transmitter includes a dialed telephone number.

9. The method of claim 4, wherein the challenge includes a random number for the mobile-transmitter to use in determining the first authentication code.

10. The method of claim 9, wherein the second authentication code is determined using the random number.

11. The method of claim 4, wherein the step of determining the authentication code includes providing the challenge code and information associated with the mobile-transmitter to a cryptographic function.

12. The method of claim 11, wherein the cryptographic function is the well-known Cellular Authentication and Voice Encryption algorithm.

13. A method for authenticating a user comprising the steps of:

determining an authentication code using a challenge code and a first set of information associated with the user, wherein the challenge code is a function of at least a type associated with an issued challenge and a state of a mobile-transmitter responding to the issued challenge; and transmitting the authentication code and a second set of information associated with the user.

14. The method of claim 13, wherein the challenge code is a function of a location associated with the mobile-transmitter.

15. The method of claim 13, wherein the challenge code is a function of time at the mobile-transmitter.

16. The method of claim 13, wherein the second set includes at least a portion of the first set.

* * * * *